United States Patent
Kramer et al.

(10) Patent No.: US 7,335,016 B2
(45) Date of Patent: Feb. 26, 2008

(54) COMBUSTION CHAMBER, PARTICULARLY FOR VEHICLE HEATING DEVICE

(75) Inventors: Michäel Kramer, Stuttgart (DE); Walter Blaschke, Deizisau (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 0 days.

(21) Appl. No.: 10/702,905

(22) Filed: Nov. 5, 2003

(65) Prior Publication Data
US 2004/0146825 A1  Jul. 29, 2004

(30) Foreign Application Priority Data
Nov. 5, 2002 (DE) ................. 102 51 438

(51) Int. Cl.
*F23D 3/40* (2006.01)
*F23D 3/00* (2006.01)
*F23Q 7/08* (2006.01)

(52) U.S. Cl. ............ 431/208; 431/11; 431/258; 431/261; 431/262; 431/240; 431/260; 237/12.3 C

(58) Field of Classification Search ............ 431/11, 431/208, 243, 258, 260–262, 240, 241, 259; 237/12.3 C
See application file for complete search history.

(56) References Cited

U.S. PATENT DOCUMENTS

| | | | |
|---|---|---|---|
| 1,901,271 A * | 3/1933 | Taft ..................... 431/196 |
| 2,205,856 A * | 6/1940 | Lamm .................. 431/262 |
| 2,229,717 A * | 1/1941 | Brace et al. ........... 431/262 |
| 2,286,854 A * | 6/1942 | Holthouse ............. 237/2 A |
| 2,286,857 A * | 6/1942 | Holthouse, Jr. ........ 431/28 |
| 2,445,341 A * | 7/1948 | Trimble et al. ........ 431/89 |
| 2,630,166 A * | 3/1953 | McKee ................ 431/168 |
| 2,745,477 A * | 5/1956 | Welin-Berger ........ 431/28 |
| 3,086,579 A * | 4/1963 | Brown ................. 431/262 |
| 3,662,222 A * | 5/1972 | Ray ..................... 219/260 |
| 3,810,734 A * | 5/1974 | Willson ................ 431/258 |
| 4,538,985 A * | 9/1985 | Zwicker ............... 431/262 |
| 4,611,985 A * | 9/1986 | Panick ................. 431/240 |
| 4,789,331 A * | 12/1988 | Kawamura ........... 431/262 |
| 5,197,871 A * | 3/1993 | Yamamoto et al. .... 431/262 |
| 5,253,806 A * | 10/1993 | Gaysert et al. ....... 237/12.3 C |
| 5,722,588 A | 3/1998 | Inoue et al. |
| 6,347,936 B1* | 2/2002 | Young et al. ......... 431/11 |

(Continued)

FOREIGN PATENT DOCUMENTS

DE    34 03 0972 C2    2/1984

(Continued)

OTHER PUBLICATIONS

Examination Report received from the German Patent Office in respect of German patent application 102 51 438.0 without copies of the references cited therein. dated May 28, 2003.

*Primary Examiner*—Carl D. Price

(57) ABSTRACT

An evaporative burner, particularly for a vehicle heating device, includes a combustion chamber housing and, in the combustion chamber housing, an evaporative medium for receiving liquid fuel and for delivering fuel vapor into a combustion chamber. A heating coil arrangement is on a side of the evaporative medium remote from the combustion chamber, and an ignition region of the heating coil arrangement extends over the evaporative medium into the combustion chamber.

7 Claims, 2 Drawing Sheets

U.S. PATENT DOCUMENTS

| | | | |
|---|---|---|---|
| 6,427,924 B2 * | 8/2002 | Takagi et al. | 237/12.3 C |
| 6,585,509 B2 * | 7/2003 | Young et al. | 431/11 |
| 6,726,114 B2 * | 4/2004 | Blaschke et al. | 237/2 R |
| 2001/0035463 A1 | 11/2001 | Takagi et al. | |

FOREIGN PATENT DOCUMENTS

| | | | |
|---|---|---|---|
| DE | 32 33 319 A1 | | 3/1984 |
| DE | 34 23 940 A1 | | 6/1984 |
| DE | 33 18 417 A1 | | 11/1984 |
| DE | 36 07 574 A1 | | 9/1987 |
| DE | 3607574 A1 | * | 9/1987 |
| DE | G 92 10 029.5 | | 7/1992 |
| EP | 61038318 | | 7/1984 |
| JP | 54-39230 | * | 3/1979 |
| JP | 62062107 A | * | 3/1987 |
| JP | 04-73503 | * | 3/1992 |

* cited by examiner

COMBUSTION CHAMBER, PARTICULARLY FOR VEHICLE HEATING DEVICE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to an evaporative burner, particularly for a vehicle heating device, including a combustion chamber housing and an evaporative medium in the combustion chamber housing for receiving liquid fuel and for delivering fuel vapor into a combustion chamber.

2. Prior Art

From DE 32 33 319 A1, an evaporative burner is known in which a layer of porous, nonwoven-type evaporative medium is arranged on a floor region of a substantially pot-shaped combustion chamber housing. A fuel supply duct feeds liquid fuel into this evaporative medium. The fuel is distributed by capillary action in this evaporative medium, and in this manner reaches the combustion chamber side of the evaporative medium. A glow ignition device in the form of a heating coil is provided in this side of the evaporative medium, and can for example have the form of a circular ring, a spiral, a star, or linearly extending configuration. Current is passed through this coil in order to start the combustion, so that sufficiently high temperatures are produced at the side of the evaporative medium facing toward the combustion chamber to ignite the air/fuel mixture present there. After the start of combustion, the excitation of this heating coil is turned down.

BRIEF SUMMARY OF THE INVENTION

The present invention has as its object to provide an evaporative burner which, with a simplified construction, ensures efficient operation, particularly in the starting phase.

This object is attained according to the invention by an evaporative burner, particularly for a vehicle heating device, including a combustion chamber housing and an evaporative medium in the combustion chamber housing for receiving liquid fuel and for delivering fuel into a combustion chamber.

This evaporative burner is characterized by a heating coil arrangement on a side of the evaporative medium remote from the combustion chamber such that the ignition region of the heating coil arrangement extends beyond the evaporative medium into the combustion chamber.

The heating coil arrangement provided in the evaporative burner according to the invention fulfills two functions. Firstly, it acts to heat the evaporative medium, particularly also to preheat it efficiently in the starting phase, and furthermore acts in the starting phase to initiate the ignition of the air/fuel mixture present in a combustion chamber. Since the heating coil arrangement is positioned in substantial regions thereof outside the combustion chamber, and is thus positioned on the back side of the evaporative medium, with likewise good heating of the evaporative medium and of the liquid fuel contained therein for the evaporation thereof, this evaporation is in no way prevented by any components present on any side of the evaporative medium facing the combustion chamber. Here only a comparatively short region, acting to produce local high temperatures, of the heating coil arrangement projects into the combustion chamber in order to initiate combustion.

For example, it can be provided that the heating coil arrangement has a heating region extending along the side if the evaporative medium remote from the combustion chamber, and that the ignition region extends beyond the heating region.

In order to be able to attain a very efficient heat transfer to the evaporative medium, it is proposed that the heating region is arranged lying on a surface of the evaporative medium. Alternatively, or in addition, a good heat transfer contact can be attained by having the heating region at least partially embedded in the evaporative medium.

A through passage aperture for the ignition region of the heating coil arrangement can be provided in the evaporative medium.

The evaporative burner according to the invention can be constructed so that the evaporative medium is arranged on a floor region of the combustion chamber housing, and that the heating region of the heating coil arrangement is arranged between the floor region and the evaporative medium. The ignition region can then be arranged substantially orthogonal to the heating region, and can have a heating conductor section extending substantially in a U-shape into the combustion chamber.

The invention furthermore relates to a heating device, particularly for a vehicle, which has an evaporative burner according to the invention.

BRIEF DESCRIPTION OF THE DRAWINGS

The present invention is described hereinafter with reference to the accompanying drawings, in which.

DETAILED DESCRIPTION OF THE INVENTION

Figure 1:
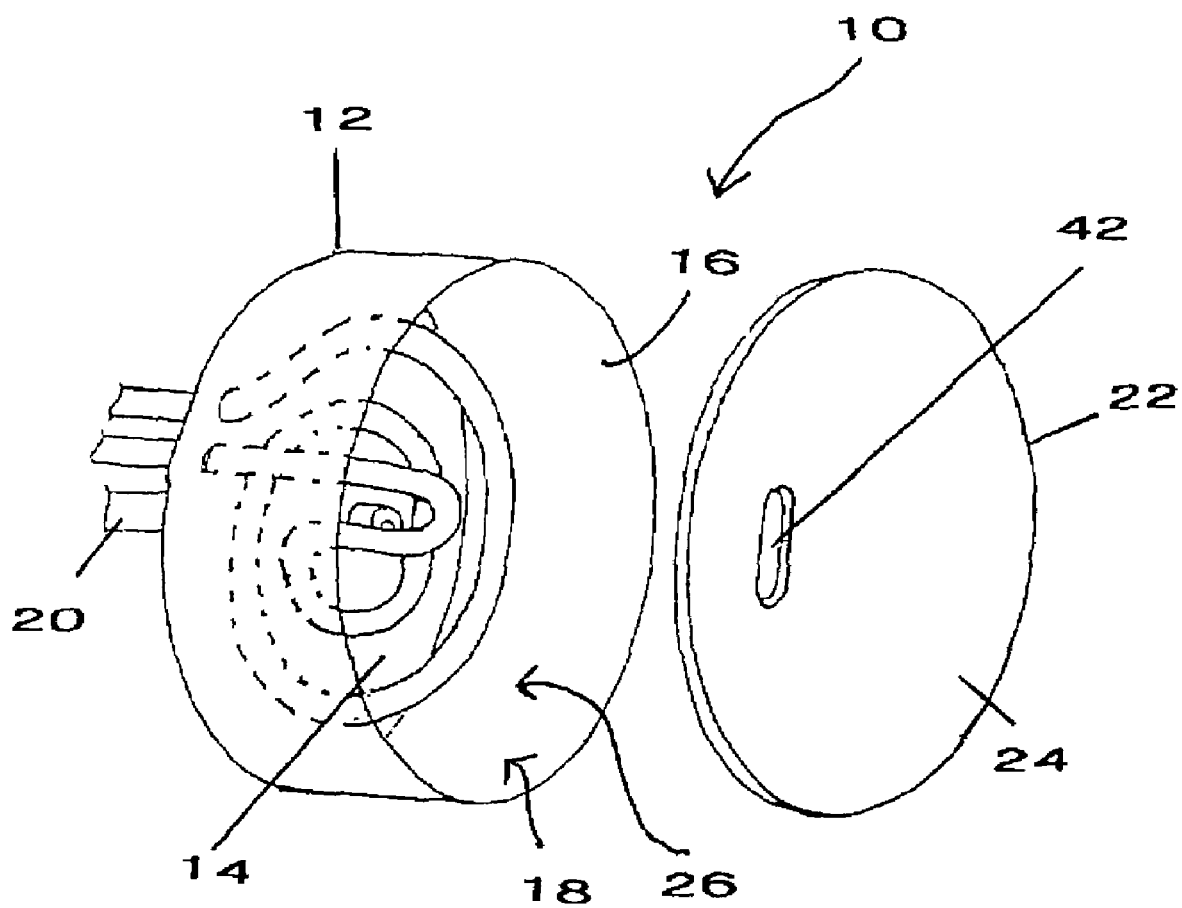
FIG. 1 shows a simplified perspective diagram of an evaporative burner.
Figure 2:
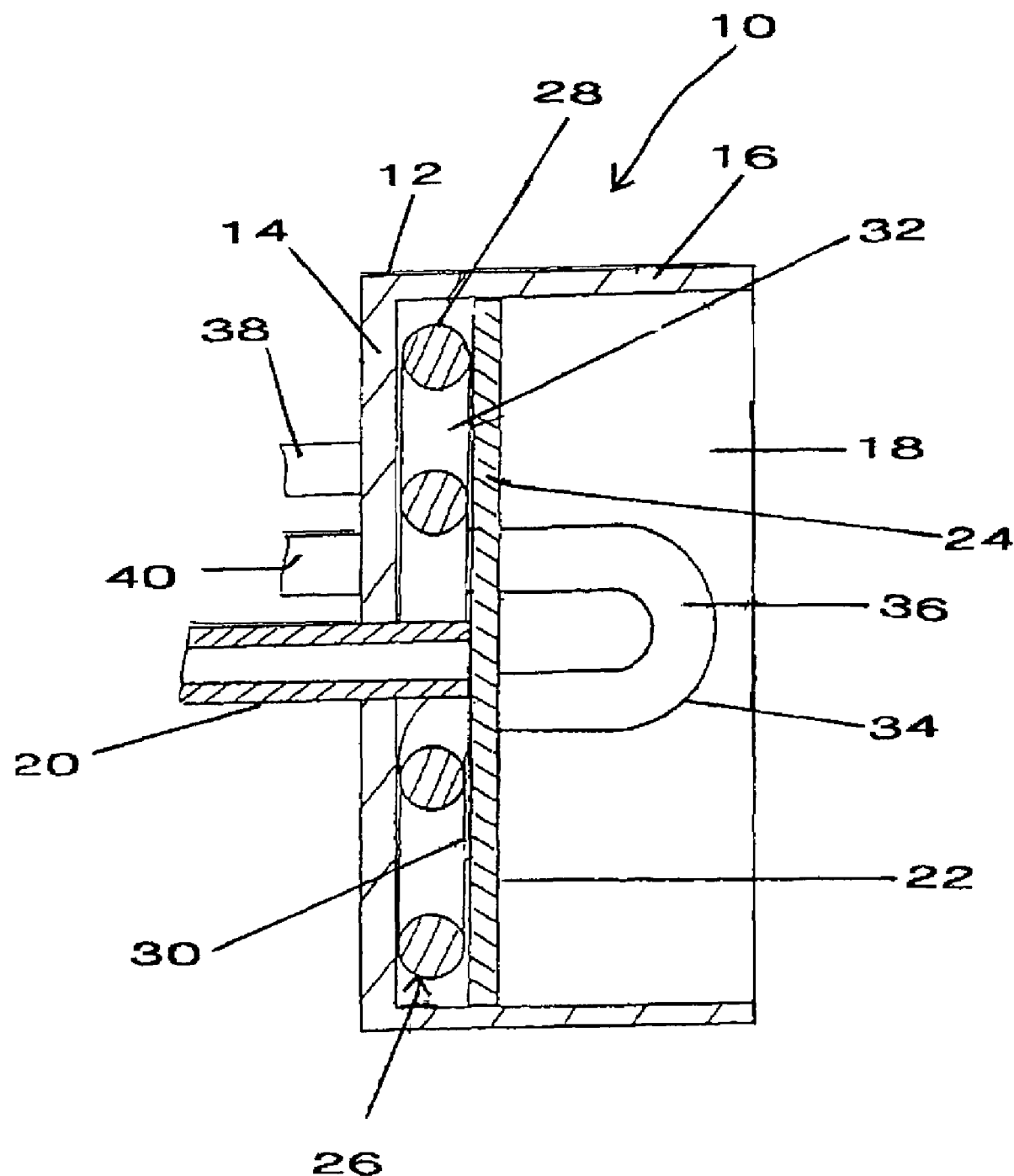
FIG. 2 shows a longitudinal section of the evaporative burner shown in FIG. 1.

An evaporative burner according to the invention is referenced 10 in FIGS. 1 and 2. The evaporative burner 10 comprises a combustion chamber housing 12, which in the example shown is of substantially pot-shaped construction and has a floor region 14 and a peripheral wall 16. This combustion chamber housing 12 at least partially delimits, with its floor region 14 and the peripheral wall 16, a combustion chamber generally referenced 18. Liquid fuel is supplied via a fuel supply duct 20 opening centrally into the floor region 14. An evaporative medium 22, shaped to match the circular shape (in this example) of the floor region 14, is arranged parallel to the floor region 14. The evaporative medium 22, which is made of porous material forwarding liquid by capillary action, such as nonwoven material, mesh material, spun yarn material, fabrics, foam material and the like, receives the liquid fuel from the fuel supply duct 20. The fuel is distributed in the evaporative medium 22 by the said capillary action and thus also reaches the side 24 of the same facing the combustion chamber 18.

A heating coil arrangement, generally referenced 26, has two important functions in the evaporative burner 10 according to the invention. Firstly, it acts to heat the evaporative medium 22 and the liquid fuel contained therein, in order to increase the vaporization rate at which fuel enters the combustion chamber 18 from the evaporative medium 22 in vapor form. Secondly, the heating coil arrangement 26 acts to ignite a mixture of combustion air and fuel vapor formed in the combustion chamber 18 at the beginning of burner operation and thus to start the combustion. This combustion air can for example be conducted via various combustion air entry apertures 17 provided in the peripheral wall 16 and shown in the lower half of FIG. 2.

It can be seen in the Figures. that the heating coil arrangement 26 has a heating region 28. The heating region is formed abutting on the side 30 of the evaporative medium 22 situated remote from the heating chamber 16 (as shown in the upper half of FIG. 2) or is at least partially embedded in the evaporative medium 22 (as shown in the lower half of FIG. 2), and in the example shown comprises a heating conductor section 32 extending as a spiral or coil. This heating conductor section 32 is thus situated substantially in a plane oriented parallel to the evaporative medium 22.

The heating coil arrangement 26 furthermore includes an ignition region 34. This extends out of the plane in which the heating region 28 is situated and is oriented substantially orthogonal to the heating region 28. The ignition region 34 includes a heating conductor section 36 extending into the combustion chamber 18 with a substantially U-shaped course and joined to the heating conductor section 32 of the heating region 28. This means that, as can above all be seen in FIG. 1, the heating conductor section 32 of the heating region 28 merges into the heating conductor section 36 of the ignition region 34. For electrical contacting, these two heating conductor sections 32, 36 with the respective junction ends 38, 40 are then passed through the floor region 14 or are respectively joined to corresponding junction leads passing through the floor region 14.

A slot-shaped opening 42 is provided in the evaporative medium 24 and, when the evaporative medium 22 is positioned in the combustion chamber housing, passes through the heating region 34 of the heating coil arrangement 26. The heating coil arrangement 26 thus extends over the evaporative medium 22 or respectively through the opening 42, in the transition between the heating region 28 and the ignition region 34.

By the positioning of the heating region 28 at the side 30 of the evaporative medium 22 remote from the combustion chamber 18, it is intended that, with good heat transfer contact likewise maintained, the evaporation of fuel at the side 24 of the evaporative medium 22 facing the combustion chamber 18 is not prevented by local covering of surface regions. Since the ignition region 34 likewise extends into the combustion chamber 18, care is taken that on excitation of the heating coil arrangement 26, not only is the evaporative medium 22 heated or preheated to the required degree, but that also such high temperatures are generated locally in the region of the combustion chamber 18 that the air/fuel mixture present there is brought to ignition. After successful ignition, current can further be passed through the heating coil arrangement 26 if necessary, for example when the external temperatures are comparatively low, though at lower power than in the starting phase.

It goes without saying that the arrangement described hereinabove can be varied in various regions. Thus the heating coil arrangement 26 can clearly have another course of the heating conductor sections 32 or respectively 36 in the heating region 28 and in the ignition region 34. Basically care is to be taken particularly that the heating region 28 is capable of heating the evaporative medium 22 as uniformly as possible, in order to achieve as uniform as possible a vaporization of the fuel. It is of course also possible to make ready in the combustion chamber housing 12 a centrally provided combustion air introduction arrangement in the floor region 14, around which the evaporative medium 22 and thereby also the heating region 28 of the heating coil arrangement 26 can be arranged annularly. Although the embodiment shown in the Figures is a very space-saving arrangement, basically it can also be imagined to line the peripheral wall 16 alternatively or additionally with the evaporative medium 22, and then to arrange the heating region of the heating coil arrangement between this peripheral wall 16 and the evaporative medium formed like a cylinder. Furthermore, to improve the heat transfer contact between the heating region 28 and the evaporative medium 22, it is conceivable to imbed the heating conductor section 32 of the heating region 28 at least locally in the evaporative medium 22. To minimize heat losses to the exterior, heat insulating material can be arranged between the floor region 14 and the heating region 28.

With the arrangement according to the invention, the same function can be attained as with the provision of a separate glow ignition member, so that the number of components to be made available can also be reduced, with a simple construction. Moreover, by the arrangement of a substantial portion of the heating coil arrangement outside the combustion chamber 18, care can be taken that it is less exposed to the very high temperatures arising in combustion operation, and thus undergoes less wear.

The invention claimed is:

1. Evaporative burner comprising a combustion chamber housing (12) and, in the combustion chamber housing (12), an evaporative medium (22) for receiving liquid fuel and for delivering fuel vapor into a combustion chamber (18), said evaporative medium (22) having a shape matching the shape of a floor region (14) of said combustion chamber housing (12) and being arranged parallel to the floor region (14), further comprising a heating coil arrangement (26) for heating the evaporative medium (22) and for igniting an air/fuel-mixture in the combustion chamber (18), said heating coil arrangement (26) comprising a heating region (28) having a heating conductor section (32) extending between the evaporative medium (22) and the floor region (14) of the combustion chamber housing (12) along and abutting a side (30) of the evaporative medium (22) remote from the combustion chamber (18), said heating coil arrangement (26) further comprising an ignition region (24) having a heating conductor section (36) merging into the heating conductor section (33) of said heating region (28) and projecting from the heating region (28) through an opening in the evaporative medium (22) and beyond the evaporative medium (22) into the combustion chamber (18).

2. Evaporative burner according to claim 1, wherein the heating region (28) is arranged abutting on the side (30) of the evaporative medium.

3. Evaporative burner according to claim 1, wherein the ignition region (34) extends through a through passage opening (42) in the evaporative medium (22).

4. Evaporative burner according to claim 1, wherein the ignition region (34) is arranged extending substantially orthogonally of the heating region (28).

5. Evaporative burner according to claim 1, wherein the ignition region (34) in the combustion chamber comprises a heating conductor section (36) extending substantially in a U-shape.

6. Heating device comprising an evaporative burner (10) according to claim 1.

7. The heating device according to claim 6, wherein the heating device is for a vehicle.

* * * * *